United States Patent [19]

Vannini et al.

[11] 4,154,487
[45] May 15, 1979

[54] SYSTEM FOR CONTROLLING THE TORQUE TRANSMITTED TO MOTOR VEHICLE DRIVING WHEELS BY A DIFFERENTIAL GEAR

[75] Inventors: Paolo Vannini; Gian Paolo Tavoni, both of Cambiano, Italy

[73] Assignee: Fiat Societa per Azioni, Turin, Italy

[21] Appl. No.: 855,129

[22] Filed: Nov. 28, 1977

[51] Int. Cl.² .............................................. B60T 8/02
[52] U.S. Cl. .................................... 303/106; 303/20
[58] Field of Search ................................. 303/106, 20

[56] References Cited

U.S. PATENT DOCUMENTS

| 3,790,227 | 2/1974 | Dozier | 303/106 |
| 3,922,022 | 11/1975 | Ochiai | 303/106 |
| 3,930,688 | 1/1976 | Rau | 303/106 |

Primary Examiner—Trygve M. Blix
Assistant Examiner—Reinhard J. Eisenzopf
Attorney, Agent, or Firm—Sughrue, Rothwell, Mion, Zinn and Macpeak

[57] ABSTRACT

A braking device for controlling the torque transmitted to driving wheels via a differential gear, in which the speed and acceleration of each wheel is detected and the appropriate wheel is braked if its speed and/or acceleration exceeds respective predetermined thresholds if the speed and acceleration of the other wheel does not exceed these thresholds; the speed difference is detected between the two wheels for the purpose of controlling, with the speed and acceleration signals, a logic control circuit, preferably a ROM, which determines when the brakes of each wheel are to be applied and released.

4 Claims, 1 Drawing Figure

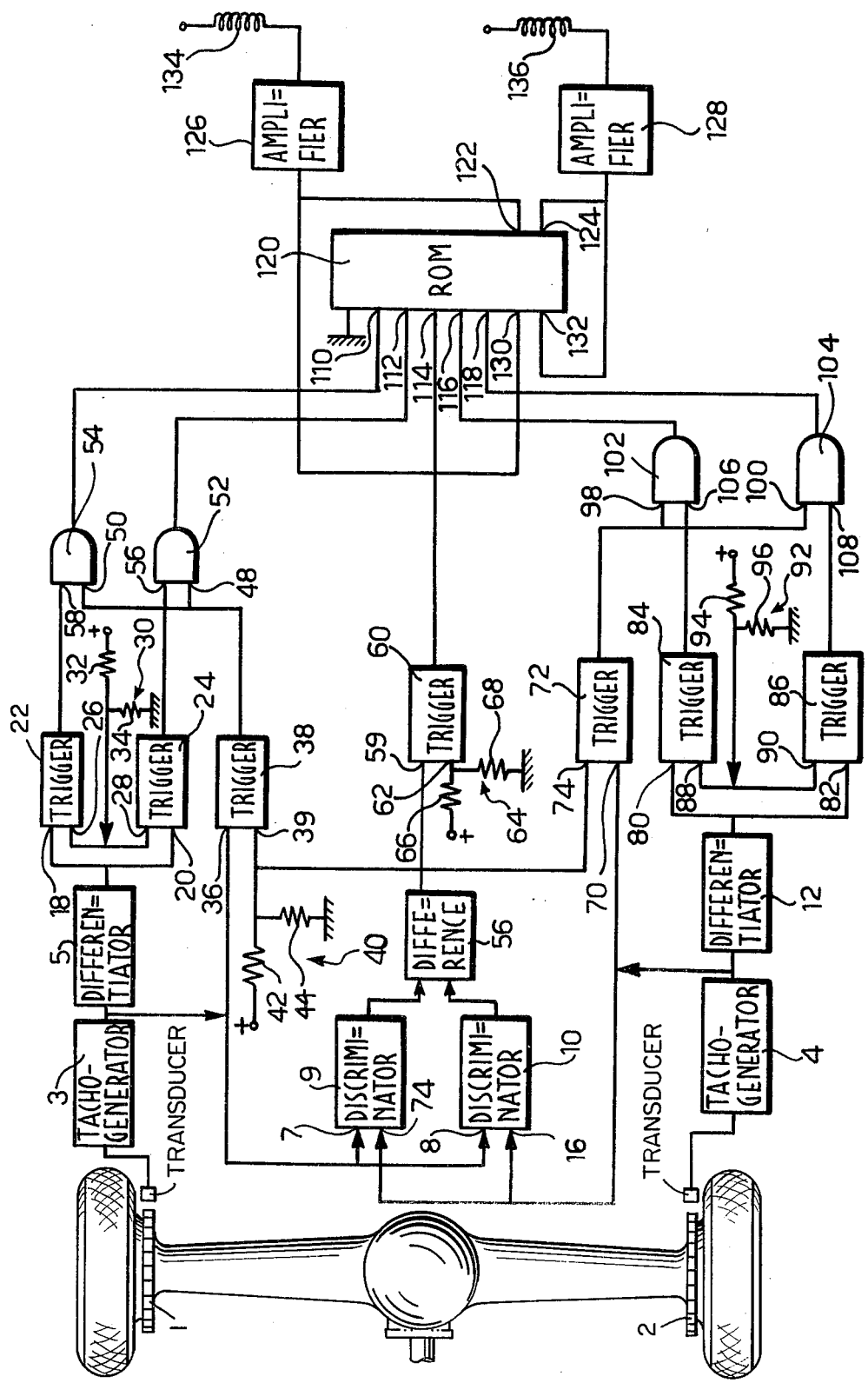

SYSTEM FOR CONTROLLING THE TORQUE TRANSMITTED TO MOTOR VEHICLE DRIVING WHEELS BY A DIFFERENTIAL GEAR

The present invention relates to a system for controlling the torque transmitted to the driving wheels of a motor vehicle of the type in which the driving wheels are driven via a differential gear. The function of a differential gear (referred to hereinafter merely as a 'differential') is to permit driven wheels to turn at different speeds whilst still transmitting torque thereto, in order to accommodate the different distance the wheels on opposite sides of the vehicle have to travel upon cornering. Unfortunately this has the disadvantage that if one wheel of a pair driven via a differential is on ground with a high coefficient of friction and the other is on ground with a low coefficient of friction such as mud or other soft ground, the latter receives all the torque from the differential and therefore starts to spin.

The problem of avoiding spinning of one wheel, and of transmitting the greater part of the torque to the wheel (or wheels) of a driving axle which are in contact with ground having the greater coefficient of friction when the other wheel (or wheels) of the same axle are on soft ground or ground having, for any reason, a low coefficient of friction, has so far only been solved by the use of the so-called self-locking or limited slip differentials.

These devices, however, are substantially different from normal differentials, and are rather complex and bulky (and also are rather expensive) and therefore are difficult to fit into mass produced motor vehicles both for technical and economic reasons.

Italian Patent Application No. 68239-A/75 filed on the 15/5/1975 by the same applicant describes an alternative solution to the problem of a slipping driving wheel, in which a braking torque is applied to a spinning wheel when the difference in speed between the two driving wheels of an axle exceeds a first predetermined threshold, this braking torque being removed when the difference in speed between the driving wheels drops below a second predetermined threshold. However, because only the speed of the driving wheels is used as the controlling parameter this system has the disadvantage of being slow in detecting what is happening to the wheels, and because of this slowness it often happens that the system operates when it is no longer required. Furthermore, it needs a different setting for every motor vehicle on which it is mounted.

The object of the present invention is to provide a system for controlling the torque applied to driving wheels of an axle including a differential, by selective braking of one or other of the wheels, in which the above mentioned disadvantages of the known system are avoided, whilst still providing a system which is of easy construction and low cost.

According to a first aspect of the present invention there is provided a braking device for the control of the torque transmitted to the driving wheels of a motor vehicle via a differential gear, comprising means for determining both the speed and the acceleration of each of the driven wheels independently, means for comparing the speed of the driven wheels with a predetermined first threshold, means for determining the difference in speed between the driven wheels and means for comparing this difference with a predetermined second threshold, means for comparing the acceleration of the wheels with a third threshold, and control means sensitive to signals representing whether or not the speed, speed difference and acceleration of the wheels exceeds the said first, second and third thresholds respectively and to signals representing whether or not the brake of each wheel is applied, the said control means being operable, if the speed of the wheels exceeds the said first threshold, to brake a wheel which accelerates at a rate greater than the said third threshold if the other wheel does not accelerate at a rate greater than the said third threshold, and to release the brake of the wheel on which it has been applied if this wheel decelerates and/or the other one accelerates, and when the difference between the speeds of the two wheels is less than the said second threshold.

A preferred embodiment of the present invention is constructed in the form of, a braking device in which the said means for determining the speed of the driven wheels comprises, for each wheel, a sensor which, in operation produces electrical signals the frequency of which are representative of the speed of rotation of the associated wheel, and means for converting the output signals from the two sensors into first and second electrical signals respectively the voltage of which is representative of the speed of rotation of the driving wheels; the said means for determining the acceleration of the driving wheels comprises differentiators fed with the said first and second electrical signals respectively and operable to produce third and fourth electrical signals representative of the acceleration of respective driving wheels; and in which the said means for determining the difference in speed of the said wheels comprises discriminator and differencing means fed with the said first and second electrical signals and operable to produce a fifth electrical signal representative of the difference between the greater and the smaller of the said first and second electrical signals; the device including means for producing a first reference signal representing the said first threshold value, first and second comparator means for comparing the said first and second electrical signals with the said first reference signal, means for producing a second reference signal representing the said second threshold, third comparator means for comparing the said fifth electrical signal with the said second reference signal, means for producing respective third reference signals representing the said third threshold value, fourth, fifth, sixth and seventh comparator means for comparing the said third and fourth electrical signals with the said third threshold signal, gating means for supplying logic signals indicating whether both the third (acceleration) threshold and the first (speed) threshold have been exceeded by the associated wheel, and logic means for determining, from the said logic signals, and from the output signal of the said third comparator means, representing whether or not the second (speed difference) threshold has been exceeded, whether to apply or release the brakes associated with the driven wheels.

One embodiment of the present invention will now be more particularly described, by way of example, with reference to the accompanying drawing which is a block schematic diagram illustrating the invention.

The system is designed to control the torque applied to two driven wheels of a motor vehicle which are driven via a differential gear. The speed of rotation of the two driven wheels is detected by respective detectors 1, 2 each associated with one of the driven wheels; these detectors may be, for example, phonic wheels mounted on respective driven wheels. The detector 1 is connected to a tacho-generator 3 and the detector 2 is connected to a tacho-generator 4.

The tacho-generator 3 is connected to a differentiator circuit 5 and to the first inputs 7 and 8 respectively of two discriminator OR gates 9 and 10. Likewise the tacho-generator 4 is connected to a differentiator circuit 12 and to the second inputs 14 and 16 of the two discriminator gating circuits 9 and 10. The discriminator circuit 9 operates to provide an output signal corresponding to the greater of the two input signals and the circuit 10 operates to produce an output signal corresponding to the smaller of the two input signals.

The differentiator circuit 5 is connected to first inputs 18 and 20 of two triggers 22 and 24 the other inputs 26 and 28 of which are fed with a signal from a voltage divider circuit 30 comprising a resistor 32 one terminal of which is connected to a positive voltage supply and the other terminal of which is connected to a resistor 34 which is grounded.

The output signal from the tacho-generator 3 is also fed to a first input 36 of a trigger 38 to the second input 39 of which is fed a signal from a voltage divider network 40 comprising a resistor 42 and a resistor 44 connected in series between a positive supply and ground. The output of the trigger 38 is connected to the first inputs 48 and 50 respectively of two AND gates 52 and 54 the second inputs of which are fed with the outputs of the previously mentioned triggers 24 and 22.

The outputs of the two discriminator circuits 9 and 10 are fed to a differencing circuit 56 operable to provide an output signal representing the difference between the two input signals. This output is connected to a first input 59 of a trigger 60 to the second input of which is connected a voltage divider network comprising a resistor 66 and a resistor 68 connected in series between a positive voltage supply and ground.

The circuit to which the detector 2 and its associated tacho-generator 4 are connected is symmetrical with the circuit to which the detector 1 and its associated tacho-generator 3 are connected. Thus, the output of the tacho-generator 4 is connected to a first input 70 of a trigger 72 to the second input of which is fed the output signal of the voltage divider 40 which also feeds the trigger 38. The differentiator circuit 12 is connected to first inputs 80 and 82 of triggers 84 and 86 the second inputs 88 and 90 of which are fed from a voltage divider network 92 comprising a resistor 94 and a resistor 96 connected in series between a positive voltage supply and earth. The output from the trigger 72 is fed to the first inputs 98 and 100 of respective AND gates 102 and 104 the second inputs 106, 108 of which are fed with the output signal from the triggers 84 and 86 respectively.

The outputs from the two gates 54, 52, from the two gates 102 and 104, and from the trigger 60 are fed to the inputs 110, 112, 114, 116, 118 respectively of a Read Only Memory (ROM) 120 having two outputs 122 and 124 which are fed to respective power amplifiers 126 and 128, and fed back to two inputs 130 and 132 of the ROM 120 itself; the power amplifier 126 is connected to a solenoid valve 134 and the power amplifier 128 is connected to a solenoid valve 136.

The circuit described above operates as follows:

The detectors 1 and 2 each supply a signal at a frequency which is dependent on the speed of the respective associated wheel: each of these frequency signals is converted into a voltage signal by one of the tacho-generators 3 and 4, the voltage of the output signal from each tacho-generator is, therefore, representative of the speed of the associated driving wheel.

The voltage signals, fed to the trigger circuits 38 and 72 cause the output signals therefrom to switch according as the speed signal is greater or smaller than a first threshold S1 determined by the values of the resistors 42, 44 of the circuit 40. Switching of the output from triggers 38 and 72 thus takes place independently in dependence on the speed of the associated wheel. If the speed of the associated wheel is higher than the first threshold level S1 set by the voltage divider circuit 40 the output of the triggers 38 and 72 will be a signal at a logic level 1, otherwise the signal will be a logic 0. The speed-representing voltage signals from the tacho-generators are also fed to the gating circuits 9 and 10 which respectively provide, at the output thereof, the greater signal and the smaller signal so that the differencing circuit 56 will always be fed with the greater of the two signals from the gating circuit 9 and the smaller of the two signals from the gating circuit 10 and will work out the difference between the greater signal and the smaller one, always obtaining a positive result, which is passed to a trigger circuit 60 which provides, at the output thereof, a signal at logic level 1 if the difference between the speeds of the two driving wheels exceeds a second threshold S2 determined by the values of the resistors 66, 68 of the voltage divider circuit 64.

The speed-representing voltage signals from the tacho-generators 3 and 4 are also fed to respective differentiator circuits 5 and 12 the outputs of which represent the acceleration of the associated driving wheels. These acceleration signals are fed to the triggers 22, 24 and to the triggers 84 and 86 respectively, where they are compared with a signal representing a third threshold A determined by the values of the resistors 32, 34 and 94, 96 of the voltage divider circuits 30 and 92.

The trigger circuit 22 provides an output signal at logic level 1 if the right wheel with which the detector 1 is associated is accelerating at a rate which exceeds the third threshold A determined by the voltage divider circuit 30 whilst it will provide an output at logic level 0 if the acceleration of the right wheel does not exceed the third threshold A determined by the voltage divider circuit 30. A logic level 0 signal will also be produced if the right wheel is decelerating.

Likewise, the output of the trigger circuit 86 will be at logic level 1 if the left wheel accelerates at a rate exceeding a threshold A' determined by the voltage divider circuit 92. Usually, of course, the threshold values (A, A') determined by the voltage dividers 30 and 92 will be the same, and they will both be referred to hereinafter as the third threshold A.

The other two triggers 24 and 84, on the other hand will have an output of logic 1 if the wheel with which they are associated does not decelerate at a rate greater than the third threshold A determined by the respective voltage divider circuits 30 and 92: if the associated wheel does decelerate at a rate greater than the threshold A, then the outputs of the trigger 24 or 84 will be at logic 0.

The outputs from the triggers 22, 24, 84 and 86 are fed to one input each of respective AND gates 54, 52, 102, 104 the other inputs of which are fed with the outputs of triggers 38 and 72 which, as mentioned above, are at logic 1 if the speed of the associated wheel exceeds the first threshold S1. Thus logic 1 outputs are only produced by all the AND gates 54, 52, 102, 104 when both the associated wheels are accelerating above the third threshold A determined by the voltage divider 30 and the speed of both the associated wheels is also greater than the first threshold S1 determined by the voltage divider circuit 40. The output signals from the AND gates are fed as address signals to the ROM 120 the output signal from which is thus dependent on the contents thereof, which have been previously written in, and by the address determined by the input signals thereto. The inputs 130 and 132 of the ROM 120, being fed with the output signals going to the right and left solenoid valves 134 and 136 respectively thus feed in information as to whether the solenoid valves are energized or not. Energization of one or other of the solenoids 134, 136 will cause operation of the brakes of the associated driven wheel.

The contents written into the ROM are such that the two solenoid valves cannot be simultaneously energized: if, when both valves are off (that is, not energized), and the right driving wheel decelerates whilst the left one is accelerating, then whether or not the speed difference threshold S2 is exceeded (determined by the trigger 60 and voltage divider 64) the brake is applied to the left wheel by energising the left solenoid valve 136 if the speed threshold S1 is exceeded.

If the right wheel does not accelerate or decelerate at a rate greater than the third threshold A determined by the voltage divider circuit 30, and the left wheel accelerates at a rate greater than the threshold A, then irrespective of whether or not the second (speed difference) threshold S2 is exceeded, the brake is applied to the left wheel, if the first (speed) threshold S1 is exceeded.

Likewise if the left driving wheel decelerates, whilst the right wheel is accelerating (that is, at a rate greater than A), then irrespective of whether or not the speed difference threshold S2 between the two wheels is exceeded, the brake is applied to the right wheel, and if the left wheel does not accelerate or decelerate at a rate exceeding the third (acceleration) threshold A determined by the circuit 92, and the right wheel accelerates at a rate greater than the third threshold A, then again, irrespective of whether the speed difference threshold S2 is exceeded, the brake is applied to the right wheel.

If the brake of the left wheel has already been applied, for example due to acceleration of this wheel and deceleration of the right wheel, the further performance of the system is as follows:

If both wheels decelerate at a rate greater than the aaccelerator threshold A, then if the speed difference between the wheels is lower than the speed difference threshold S2 the left solenoid valve is de-energized; if the right wheel does not accelerate or decelerate at a rate exceeding the third (acceleration) threshold A, then if the left wheel does not accelerate at a rate greater than A, the left electrovalve will be de-energized when the difference in speed is lower than the second threshold S2; Likewise the left solenoid valve is de-energized, if both the right wheel and the left wheel accelerate, at a rate greater than A, when the difference in speed of the wheels is lower than the second threshold S2.

On the other hand, if the right wheel accelerates at a rate greater than A and the left wheel decelerates at a rate greater than the threshold A, the right solenoid valve is energized and the left solenoid valve is de-energized; likewise if the right wheel accelerates at a rate greater than the threshold A and the left wheel does not accelerate, even if it does not decelerate at a rate exceeding the acceleration threshold A, then the right solenoid valve is energized and the left solenoid valve is de-energized.

The case when the right solenoid valve is energized (braking the right wheel) and the left solenoid valve is de-energized is symmetrical; that is if both the wheels decelerate at a rate greater than the threshold A, and the difference in speed between them is smaller than the speed difference threshold S2, the right solenoid valve is de-energized; if the left wheel neither accelerates nor decelerates at a rate exceeding the acceleration threshold A, and the right wheel decelerates, then when the difference in speed between the wheels is smaller than the speed difference threshold S2, the right solenoid valve is de-energized: even if the right wheel does not decelerate at a rate greater than the threshold A, the right solenoid valve will be de-energized if the speed difference falls below the second threshold S2.

If both wheels accelerate at a rate greater than A, then when the difference in speed is smaller than the second threshold S2 the right electrovalve is de-energized, but if the left wheel accelerates at a rate greater than the threshold A and the right one decelerates at a rate greater than the threshold A, then regardless of whether the speed difference is above or below the second threshold S2 the left electrovalve is energized and the right one is de-energized; likewise if the left wheel accelerates at a rate greater than A, even if the right wheel does not accelerate or decelerate at a rate exceeding the acceleration threshold A, then the solenoid valve associated with the left wheel is energized and the right one is de-energized.

In all other conditions, which have not been discussed the solenoid valves are controlled to remain in the same state as they happen to be.

What is claimed is:

1. In a braking system for the control of the torque transmitted to the driving wheels of a motor vehicle via a differential gear, the improvement comprising:
   means for determining the speed of each of the driven wheels of said motor vehicle, said speed determining means comprising, for each wheel, a sensor operating to produce electrical signals the frequency of which is representative of the speed of rotation of the associated wheel, and means for converting the output signals from said sensors into first and second electrical signals respectively, the voltage of said electrical signals being representative of the speed of rotation of the driven wheels;
   means for determining the acceleration of each of said driven wheels, said acceleration determining means comprising differentiators fed with said first and second electrical signals respectively and operating to produce third and fourth electrical signals representative of the acceleration of the respective driven wheels;
   means for comparing the speed of each of said driven wheels with a predetermined first threshold;
   means for determining the difference in speed between said driven wheels comprising discriminator and differencing means, said discriminator and differencing means being connected to said means for producing said first and second electrical signals and operating to produce therefrom a fifth electrical signal representative of the difference between the greater and the smaller of said first and second electrical signals;
   means for comparing the difference in speed between said driven wheels with a predetermined second threshold and operating to produce an output signal representing whether or not said second threshold is exceeded;

means for comparing the acceleration of each of said wheels with a third threshold value, said acceleration comparing means operating to produce output signals representing whether or not said third threshold is exceeded;

control means sensitive to said signals representing whether or not said speed, speed difference and acceleration of said wheels exceed said first, second and third thresholds respectively, said control means operating if the speed of said wheels exceeds said first threshold to brake a wheel which accelerates at a rate greater than said third threshold if the other wheel does not accelerate at a rate greater than said third threshold, and to release the brake if the wheel on which it has been applied if this wheel decelerates and/or the other one accelerates or when the difference between the speeds of said two wheels is less than said second threshold, said control means comprising:

a. means for producing a first reference signal representing said first threshold value;
b. first and second comparator means operating to compare said first and second electrical signals respectively with said first reference signal;
c. means for producing a second reference signal representing said second threshold;
d. third comparator means operating to compare said fifth electrical signal with said second reference signal;
e. means for producing respective third reference signals representing said third threshold value;
f. fourth and fifth comparator means operating to compare said third electrical signal in opposite senses respectively with said third threshold signal;
g. sixth and seventh comparator means operating to compare said fourth electrical signal in opposite senses respectively with said third threshold signal;
h. first through fourth gating means, one input of each of said gating means being connected to the output of said fourth, fifth, sixth and seventh comparator means respectively, a second input of said first and second gating means being coupled to the output of said first comparator means and a second input of said third and fourth gating means being coupled to the output of said second comparator means and operating to produce logic signals indicating whether both of said third threshold and said first threshold have been exceeded by the associated wheel; and
i. logic means having inputs connected to the outputs of said first through fourth gating means and to said third comparator means to receive the output signals therefrom representing whether or not said second threshold has been exceeded and operating to determine whether to apply or release the brakes associated with each of said driven wheels.

2. The braking system of claim 1, wherein:

said sensor for each wheel comprises a phonic wheel, said means for converting said output signals comprises a respective tacho-generator connected to the output from each phonic wheel, said discriminator means comprising first and second gating circuits, said first gating circuit producing and output signal representing the greater of said first and second electrical signals which are fed as inputs thereto and said second gating circuit producing an output representing the smaller of said first and second electrical signals which are fed as inputs thereto, said differencing means being connected to the outputs of said two gating circuits, the output of said differencing circuit being connected, to said third comparator circuit, and wherein:

said gating means are AND gates, each AND gate having first and second inputs.

3. The braking system of claim 2, wherein said logic means is a Read Only Memory.

4. The braking system of claim 3, wherein the outputs of said control means are connected to respective power amplifiers connected to turn to respective solenoid valves which control the operation of the braking means for respective wheels.

* * * * *

UNITED STATES PATENT AND TRADEMARK OFFICE
CERTIFICATE OF CORRECTION

PATENT NO. : 4,154,487
DATED : May 15, 1979
INVENTOR(S) : Paolo VANNINI et al

It is certified that error appears in the above-identified patent and that said Letters Patent are hereby corrected as shown below:

IN THE HEADING; the following should be inserted:

--[30] Foreign Application Priority Data

Dec. 17, 1976   Italy ......... 70010-A/76 --

Signed and Sealed this

Fourteenth Day of August 1979

[SEAL]

*Attest:*

LUTRELLE F. PARKER
*Attesting Officer*   *Acting Commissioner of Patents and Trademarks*